United States Patent

Toben et al.

(10) Patent No.: US 8,459,307 B2
(45) Date of Patent: Jun. 11, 2013

(54) DUCT FASTSEAM

(75) Inventors: John J. Toben, Cedar Rapids, IA (US);
Ashok M. Shah, Naperville, IL (US);
Richard F. Blum, Bolingbrook, IL (US);
Michael C. Borwig, Swisher, IA (US)

(73) Assignee: Met-Coil System Corp., Westfield, MA (US)

( * ) Notice: Subject to any disclaimer, the term of this patent is extended or adjusted under 35 U.S.C. 154(b) by 305 days.

(21) Appl. No.: 12/698,492

(22) Filed: Feb. 2, 2010

(65) Prior Publication Data
US 2010/0135720 A1    Jun. 3, 2010

Related U.S. Application Data

(62) Division of application No. 10/668,734, filed on Sep. 23, 2003, now Pat. No. 7,681,297.

(60) Provisional application No. 60/412,740, filed on Sep. 23, 2002.

(51) Int. Cl.
*F16L 9/00* (2006.01)
(52) U.S. Cl.
USPC ............ 138/166; 138/162; 138/163; 138/168
(58) Field of Classification Search
USPC .................................. 138/166, 162, 163, 168
See application file for complete search history.

(56) References Cited

U.S. PATENT DOCUMENTS

| | | | |
|---|---|---|---|
| 354,390 A * | 12/1886 | Caldwell | 138/168 |
| 1,138,402 A | 5/1915 | Orr | |
| 1,664,885 A | 4/1928 | Huenefeld | |
| 2,076,228 A * | 4/1937 | Dressing | 72/48 |
| 2,086,143 A * | 7/1937 | Van Huffel | 138/152 |
| 2,286,118 A | 6/1942 | Sleeth | |
| 2,483,095 A * | 9/1949 | Ingels | 138/168 |
| 2,483,412 A | 10/1949 | Harker | |
| 2,500,384 A | 3/1950 | Schell | |
| 2,802,487 A | 8/1957 | Breehl | |
| 3,701,194 A * | 10/1972 | Widman | 29/278 |
| 5,189,784 A | 3/1993 | Welty | |
| 5,243,750 A | 9/1993 | Welty | |
| 5,353,616 A | 10/1994 | Fischer et al. | |
| 5,450,879 A | 9/1995 | Toben | |
| 5,996,644 A | 12/1999 | Iizuka | |
| 6,056,021 A | 5/2000 | Iizuka | |
| 6,105,227 A | 8/2000 | Bota | |
| 6,378,184 B1 | 4/2002 | Bota | |
| 7,681,297 B2 * | 3/2010 | Toben et al. | 29/521 |
| 2004/0111988 A1 * | 6/2004 | Toben et al. | 52/250 |

FOREIGN PATENT DOCUMENTS

EP    0071586 A1    2/1983

\* cited by examiner

*Primary Examiner* — James Hook
(74) *Attorney, Agent, or Firm* — McCormick, Paulding & Huber LLP

(57) ABSTRACT

A seam for ductwork has a male end portion integrally formed at a distal end of a duct wall and a female end portion integrally formed at another distal end of the duct wall. The female end portion includes a first fold and a second fold, which define a female groove for accommodating the male portion. A distal end of the second fold is bent transverse to the female groove prior to the male portion being inserted into the female groove.

2 Claims, 4 Drawing Sheets

US 8,459,307 B2

DUCT FASTSEAM

CROSS REFERENCE TO RELATED APPLICATIONS

This application is a Divisional application of U.S. Utility application Ser. No. 10/668,734, filed on Sep. 23, 2003, and claims the benefit of U.S. Provisional Application Ser. No. 60/412,740, filed on Sep. 23, 2002, both of which are herein incorporated by reference in their entireties.

FIELD OF THE INVENTION

This invention relates in general to a duct fastseam, and deals more particularly with a duct fastseam, which may be easily assembled by hand.

BACKGROUND OF THE INVENTION

Rectangular or box-shaped ducts are extensively utilized in heating and ventilating systems to distribute heated or cooled air throughout a structure. These ducts are commonly formed from differing gauges of sheet metal in sections of predetermined lengths, which are then connected to one another to form a continuous duct for distributing air.

Typically, each section of duct is formed by bending two pieces of sheet metal of the desired length at a 90° angle. One edge of each piece is formed to include a longitudinally extending groove, forming thereby the female portion of the seam, while the other longitudinal edge of each piece is bent over along its length to form thereby the male portion of the seam. The two pieces are then assembled by inserting the male portion of each piece into the female portion, leaving an edge extending beyond the joint from the female portion. This extended edge must then be bent over to lock the seam. This seam is known in the industry as a 'Pittsburgh' lock or seam.

While these known duct systems are successful to a degree, they suffer from several logistical problems. Firstly, the insertion of the male portion into the female portion of the seam requires a great deal of force due to the tight dimensional constraints of the formed female end. To accomplish this goal, operators must force the male end into the female end, typically utilizing a hammer or the like. Likewise, the extended edge of the female portion must also be hammered over in order to lock the seam closed. These hammering operations are highly labor intensive and quite loud, oftentimes requiring ear protection for the operators who assemble the finished duct work. Moreover, the time and effort extended on hammering the male portion into the female portion, and then hammering the extended edge of the female portion over to seal the seam, can substantially increase the time and expense of any duct fabrication and installation job, typically by as much as 50% or more.

With the forgoing problems and concerns in mind, it is the general object of the present invention to provide a duct fastseam, which overcomes the above-described drawbacks while maximizing effectiveness and flexibility in the assembling process.

SUMMARY OF THE INVENTION

It is an object of the present invention to provide a duct fastseam.

It is another object of the present invention to provide a duct fastseam that may significantly reduce the assembly time of ductwork.

It is another object of the present invention to provide a duct fastseam which may significantly reduce the noise associated with assembling duct work.

It is another object of the present invention to provide a duct fastseam that may be fitted together manually, without tooling.

It is another object of the present invention to provide a duct fastseam that may be easily fitted together by hand.

It is another object of the present invention to provide a duct fastseam that is capable of maintaining the duct in a substantially square condition even when the fastseam has yet to be completely sealed.

It is another object of the present invention to provide a duct fastseam that may be completely sealed by a sealing apparatus employing only a single roller.

It is another object of the present invention to provide a duct fastseam that resembles a known Pittsburgh seam when completely sealed.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
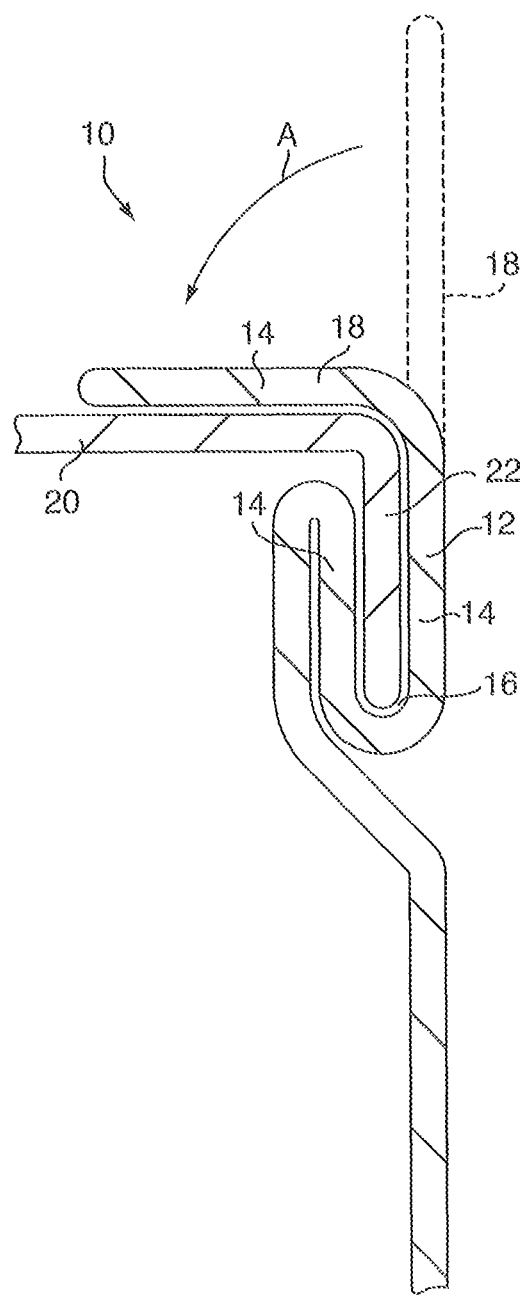
FIG. 1 is a cross-sectional view of a known duct seam.

FIG. 1 illustrates a cross-sectional view of know duct seam 10, commonly referred to in the field as a 'Pittsburgh' seam. As shown in FIG. 1, the seam 10 includes a female portion 12 which is formed by repetitively bending, or roll forming, the duct material, typically sheet metal or the like, so as to form three substantially parallel folds 14. The folds 14 serve to define a female groove 16, wherein one of the folds 14 preliminarily extends beyond the duct edge to establish a sealing portion 18.

The seam 10 further includes a longitudinal section of the duct wall 20, which is bent at a substantially right angle to form a male portion 22. As will be appreciated, the male portion 22 is sized for tight fitting within the female groove 16 of the female portion 12 when fully assembled.

In operation, the male portion 22 of the seam 10 is initially fitted into the female groove 16 when the sealing portion 18 remains in its unsealed position, as represented by the dashed lines in FIG. 1.

Once the male portion 22 has been inserted into the female groove 16, the sealing portion 18 must then be hammered or otherwise bent down, in the direction of the arrow A, against the duct wall 20 in order to complete the sealing of the seam 10. The hammering over of the sealing portion 18 is typically accomplished either manually, or with the use of a pneumatic hammer or the like. It will be readily appreciated that the hammering of the male portion 22 and the sealing portion 18 is highly time consuming and oftentimes noisy to the point of being injurious to the ears of the operators who are assembling the seam 10. It should additionally be noted that prior to the sealing portion 18 being hammered-over to complete the sealing process, the seam 10 is incapable of maintaining a substantially square condition. That is, without being completely sealed, the male portion 22 of the seam 10 will disengage from the female groove 16 and cause thereby the seam 10 to lose its structural form.

Figure 2:
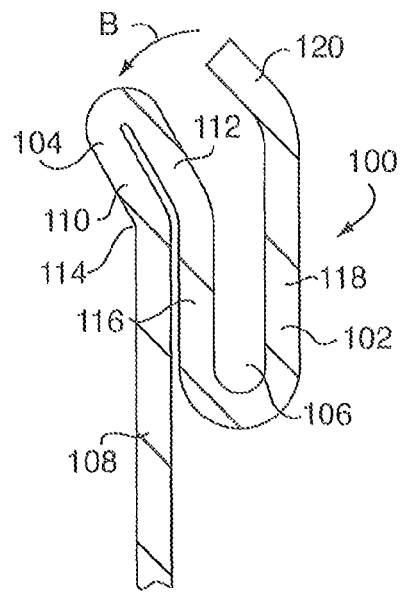
FIG. 2 is a cross-sectional view of the female end of a duct fastseam, according to a first embodiment of the present invention.

In contrast, FIG. 2 illustrates one half of a fastseam 100 which is capable of maintaining its structural form, even when the sealing process is not yet completed, according to one embodiment of the present invention. As depicted in FIG. 2, the fastseam 100 includes a female portion 102 that is formed by longitudinally bending, or roll forming, a plane of duct material so as to form a hemmed ridge 104 and a female groove 106.

Figure 4:
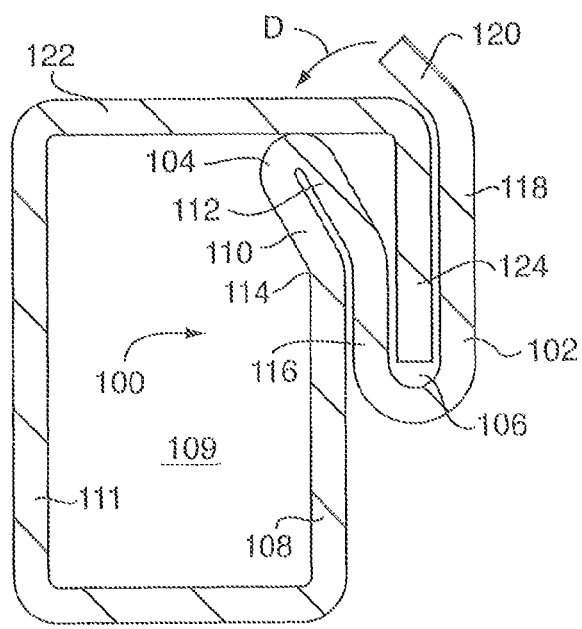
FIG. 4 is a cross-sectional view of the male end of the duct fastseam after it is inserted into the female end illustrated in FIG. 2.

The duct wall 108 is initially bent inwards, that is, towards what will eventually become the interior 109 (as shown in FIG. 4) of the finished duct, to form the first fold 110 of the hemmed ridge 104. The first fold 110 is then bent back upon itself in a non-parallel manner to form a second fold 112 of the hemmed ridge 104. The plane of the second fold 112 is then broken in the area adjacent the break point 114 of the first fold 110, to form a third fold 116 which extends a predetermined distance substantially parallel to, and in close association with, the plane of the duct wall 108.

The third fold 116 is bent outwards, that is, away from the duct wall 108, and back upon itself to form a fourth fold 118 extending substantially parallel to the duct wall 108. As depicted in FIG. 2, the female groove 106 defined between the third fold 116 and the fourth fold 118 is dimensioned to be slightly larger than the thickness of the duct material utilized in the formation of a male portion of the fastseam 100, as will be described in more detail later.

The fourth fold 118 includes a sealing portion 120, which is bent transverse to the female groove 106 prior to an unillustrated male portion being inserted into the female groove 106. The sealing portion 120 may then be further bent in the direction of arrow B in order to completely seal the fastseam 100 when the unillustrated male portion is inserted into the female groove 106.

Figure 3:
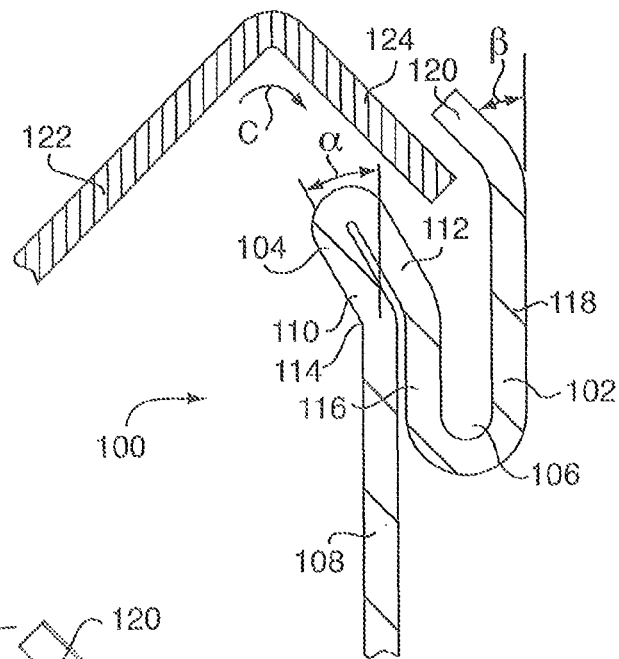
FIG. 3 is a cross-sectional view of the male end of the duct fastseam as it is being inserted into the female end illustrated in FIG. 2.

Turning to FIG. 3, the fastseam 100 further includes a longitudinal section of a matching duct wall 122 which is bent at a substantially right angle to form a male portion 124. The male portion 124 may then be inserted into the female groove 106 of the female portion 102 in the general direction of arrow C. The male portion 124 is the equivalent of the male portion 22 discussed in conjunction with FIG. 1.

It is therefore an important aspect of the present invention that the hemmed ridge 104 and the sealing portion 120 are formed at the proper angles in order to permit the insertion of the male portion 124 into the female groove 106 without the use of a hammer or the like. That is, during assembly, the walls of the rectangular duct are slightly deformed, with respect to one another, from a square condition to a parallelogram condition to allow the male portion 124 to be eased into the female groove 106 without the use of any tools. Moreover, in contrast with the commonly known Pittsburgh seam illustrated in FIG. 1, the angles at which the hemmed ridge 104 and the sealing portion 120 are formed, effectively prevent the male portion 124 from disengaging from the female groove 106 once the two have been fitted together.

It is envisioned that the hemmed angle $\alpha$ is formed preferable between 10 to 60 degrees, and more preferably is formed at approximately 30 degrees. Moreover, the sealing angle $\beta$ is envisioned to be formed most preferably between 45 and 60 degrees. It will be readily appreciated that hemmed angle $\alpha$ and sealing angle $\beta$ work in conjunction with one another to permit enough clearance in the female portion 102 to allow the male portion 124 to be position in the female groove 106 with a minimum amount of applied force, while also preventing the male portion 124 from disengaging from the female groove 106 after being positioned therein.

It will further be appreciated that the relationship between the hemmed angle $\alpha$ and sealing angle $\beta$ is such that they are generally inversely proportional to one another, wherein when, for example, the hemmed angle $\alpha$ is increased, the sealing angle $\beta$ may be correspondingly decreased. Regardless of the specific angles utilized by the hemmed angle $\alpha$ and sealing angle $\beta$, the primary consideration is to ensure enough dimensional clearance to permit the male portion 124 to be inserted into the female groove 106 without the use of hammers or other tools, as previously mentioned.

It should also be noted that another important consideration does exist, however, regarding the magnitude of the sealing angle $\beta$. As has been discussed previously, the sealing portion 120 must be bent over in order to finish the sealing process of the fastseam 100. Towards this end, it will be readily apparent that the larger the sealing angle $\beta$ is, the easier it will be to bend the sealing portion 120 to its sealed position. Likewise, the smaller the sealing angle $\beta$ is, the more effort will be required to bend the sealing portion 120 to its sealed position.

It is therefore another important aspect of the present invention that the fastseam 100 includes a partially 'hammered-over' sealing portion 120. That is, by forming the female portion 102 to include a sealing portion 120 which is inclined at the sealing angle $\beta$, the present invention makes the subsequent sealing process of the ductwork much easier, quieter and less labor intensive, even if tradition hammering is later employed for this purpose. The present invention, however, effectively removes the necessity for any hammering, manual or pneumatic, to complete the sealing process and instead enables the use of a single-roller sealing apparatus to be employed for this purpose.

FIG. 4 illustrates the condition of the fastseam 100 after the male portion 124 has been hand-inserted into the female groove 106. As shown in FIG. 4, it is another important aspect of the present invention that once the male portion 124 is located in the female groove 106 and the walls of the rectangular duct 111 are relaxed with respect to one another, back to their original square condition, that the configuration of the fastseam 100 prevents the disengagement of the male portion 124, even when the sealing portion 120 has not yet been completely bent over to complete the sealing process.

For the purposes of this invention, a 'square condition' refers to the condition in which there exists a substantially perpendicular relationship between the duct wall 122 and the duct wall 126. Likewise, a 'parallelogram condition' refers to the condition in which the duct wall 122 and the duct wall 126 have been forced, temporarily, into an orientation in which there does not exist a substantially perpendicular relationship between the duct wall 122 and the duct wall 126, as shown in FIG. 3.

Returning to FIG. 4, the ability of the fastseam 100 to prevent the disengagement of the male portion 124 from the female groove 106, once the fastseam is relaxed into its square condition, provides many inherent advantages. Not only can the fastseam 100 be initially assembled by hand, without the use of hammers or the like, but once assembled, the fastseam 100 maintains its structural integrity until it can be completely sealed by bending the sealing portion 120 in the general direction of arrow D via a single roller sealing apparatus, as discussed previously. Moreover, the present invention provides a less cumbersome and more streamlined assembly process on the whole, especially as the partially assembled ducts may be easily handled without coming apart despite not being completely sealed.

Figure 5:
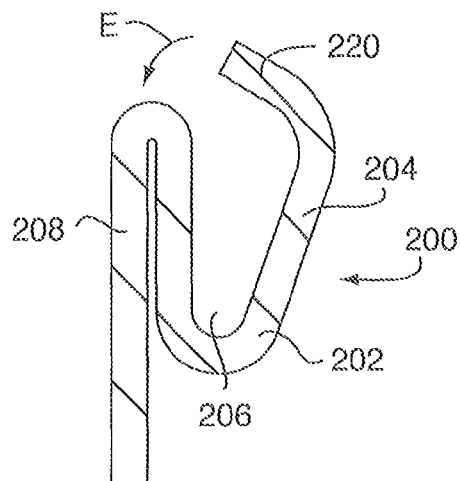
FIG. 5 is a cross-sectional view of the female end of a duct fastseam, according to another embodiment of the present invention.

FIG. 5 illustrates one half of a fastseam 200, which also does not require the use of a hammer or the like during its initial assembly, according to another embodiment of the present invention. As depicted in FIG. 5, the fastseam 200 includes a female portion 202 which is formed by repetitively bending, or roll forming, the duct material, typically sheet metal or the like, back upon itself so as to form an open fold 204. The open fold 204, in association with a substantially parallel fold 208, serves to define a female groove 206, wherein the open fold 204 includes a sealing portion/fold 220 bent at an angle to the open fold 204 prior to a male portion of the fastseam being inserted into the female groove 206. The sealing portion 206 may then be bent in the direction of arrow E in order to completely seal the fastseam 200 after the unillustrated male portion is inserted into the female groove 206.

It will be readily appreciated that by forming the sealing portion/fold 220 to be bent at an angle to the open fold 204 prior to a male portion of the fastseam being inserted into the female groove 206, in contrast to the configuration of known Pittsburgh seams, the present invention ensures that the male portion of the fastseam may remain partially secured within the female groove 206 even prior to the sealing portion/fold 220 being completely sealed by a roller or the like.

As depicted in FIG. 5, the female groove 206 defined between the open fold 204 and the parallel fold 208 is dimensioned to be slightly larger than the thickness of the duct material utilized in the formation of a male portion of the fastseam 200, as will be described in more detail later.

Figure 6:
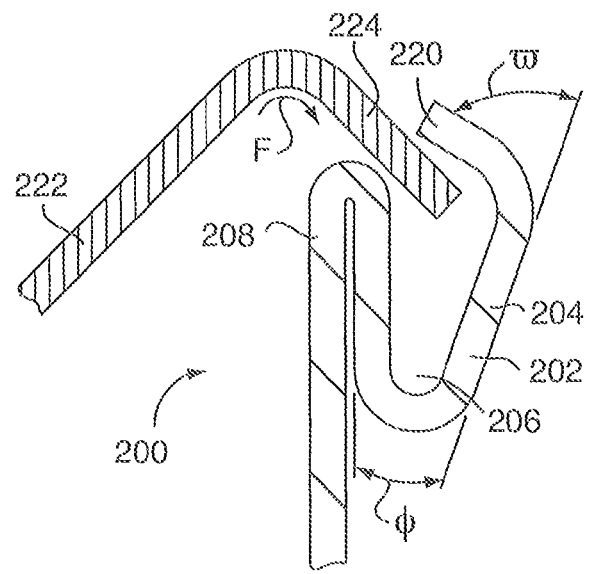
FIG. 6 is a cross-sectional view of the male end of a duct fastseam as it is being inserted into the female end illustrated in FIG. 5.

Turning to FIG. 6, the fastseam 200 further includes a longitudinal section of a matching duct wall 222 which is bent at a substantially right angle to form a male portion 224. The male portion 224 may then be inserted into the female groove 206 of the female portion 202 in the general direction of arrow E.

It is therefore an important aspect of the present invention that, similar to the embodiment disclosed in FIGS. 2-4, the open fold 204 and the sealing portion 220 are formed at the proper angles in order to permit the insertion of the male portion 224 into the female groove 206 without the use of a hammer or the like. That is, during assembly, the walls of the rectangular duct are slightly deformed, with respect to one another, from a square condition to a parallelogram condition to allow the male portion 224 to be eased into the female groove 206 without the use of any tools.

It is envisioned that the open angle $\phi$ be formed preferable between 10 to 30 degrees, and more preferably to be formed at approximately 20 degrees from the parallel plane defined by the parallel fold 208. Moreover, the sealing angle $\omega$ is envisioned to be formed most preferably between 45 and 60 degrees. It will be readily appreciated that the open angle $\phi$ and sealing angle $\omega$ work in conjunction with one another to permit enough clearance in the female portion 202 to allow the male portion 224 to be position in the female groove 206 with a minimum amount of applied force.

It will further be appreciated that the relationship between the open angle $\phi$ and sealing angle $\omega$ is such that they are generally proportional to one another, wherein when, for example, the open angle $\phi$ is increased, the sealing angle $\omega$ may also be correspondingly increased. Regardless of the specific angles utilized by the open angle $\phi$ and sealing angle $\omega$, the primary consideration is to ensure enough dimensional clearance to permit the male portion 224 to be inserted into the female groove 206 without the use of hammers or other tools, as previously mentioned.

It should also be noted that another important consideration does exist, however, regarding the magnitude of the sealing angle $\omega$. As has been discussed previously, the sealing portion 220 must be bent over in order to finish the sealing process of the fastseam 200. Towards this end, it will be readily apparent that the larger the sealing angle $\omega$ is, the easier it will be to bend the sealing portion 220 to its sealed position. Likewise, the smaller the sealing angle $\omega$ is, the more effort will be required to bend the sealing portion 220 to its sealed position. By forming the female portion 202 to include a sealing portion 220 which is already inclined at the sealing angle $\omega$, another important aspect of the present invention is also realized. That is, the sealing portion 220 makes the subsequent sealing process of the ductwork much easier, quieter and less labor intensive, even if tradition hammering is later employed for this purpose.

As mentioned previously in conjunction with the embodiment illustrated in FIGS. 2-4, the inclined orientation of the sealing portion 220 effectively removes the necessity for any hammering, manual or pneumatic, to complete the sealing process of the fastseam 200 and instead enables the use of a single-roller sealing apparatus to be employed for this purpose.

Figure 7:
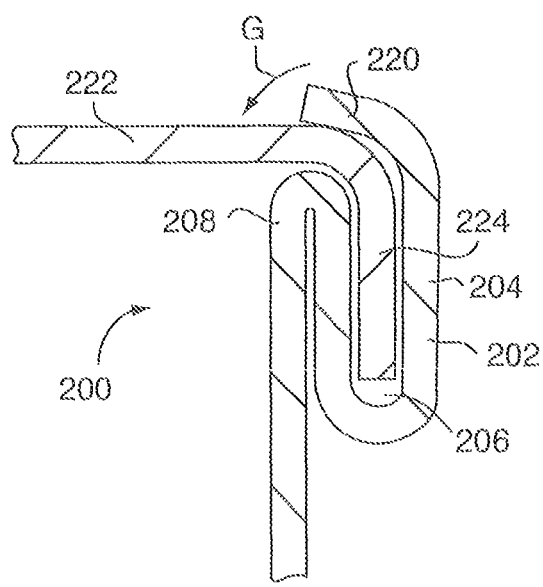
FIG. 7 is a cross-sectional view of the male end of the duct seam after it is inserted into the female end illustrated in FIG. 5.

FIG. 7 illustrates the condition of the fastseam 200 after the male portion 224 has been hand-inserted into the female groove 206. As shown in FIG. 7, it is another important aspect of the present invention that once the male portion 224 is located in the female groove 206 and the walls of the rectangular duct are relaxed, with respect to one another, back to their original square condition, that the configuration of the fastseam 200 prevents the disengagement of the male portion 224, even when the sealing portion 220 has not yet been bent over to complete the sealing process.

As discussed previously, the ability of the fastseam 200 to prevent the disengagement of the male portion 224 from the female groove 206, once the fastseam is relaxed into its square condition, provides many inherent advantages. Not only can the fastseam 200 be initially assembled by hand, without the use of hammers or the like, but once assembled, the fastseam 200 maintains its structural integrity until it can be completely sealed by bending the sealing portion 220 in the general direction of arrow G via a single roller sealing apparatus, as discussed previously. Moreover, the present invention provides a less cumbersome and more streamlined assembly process on the whole, especially as the partially assembled duct may be easily handled without coming apart despite not being completely sealed, similar to the embodiment discussed in conjunction with FIGS. 2-4.

Figure 8:
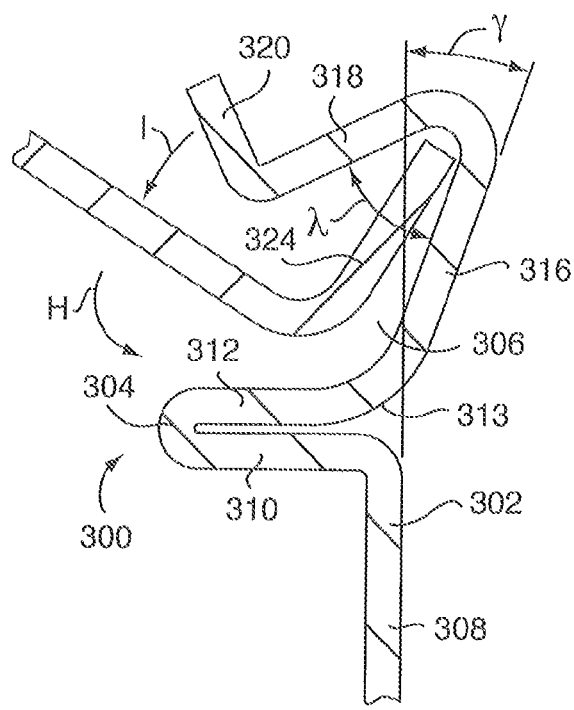
FIG. 8 is a cross-sectional view of the male end of a duct fastseam as it is being inserted into the female end, according to another embodiment of the present invention.
Figure 9:
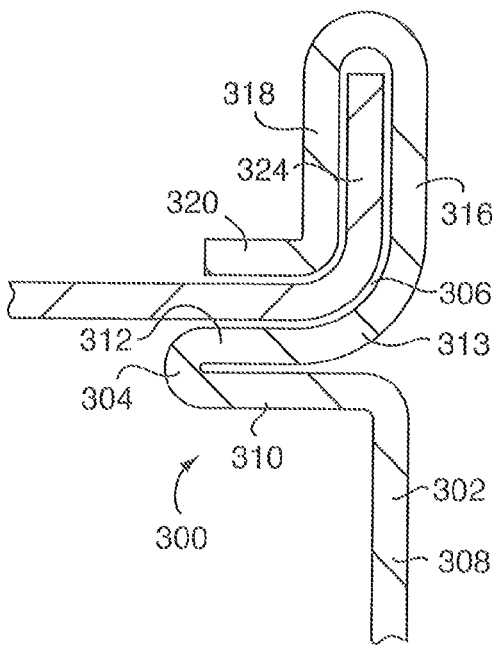
FIG. 9 is a cross-sectional view of the male end of the duct seam after it is inserted into the female end illustrated of FIG. 8.

FIGS. 8 and 9 illustrate yet another embodiment of the present invention. As depicted in FIG. 8, the fastseam 300 includes a female portion 302 that is formed by longitudinally bending, or roll forming, a plane of duct material so as to form a hemmed ridge 304 and a female groove 306.

The duct wall 308 is initially bent inwards, that is, towards what will eventually become the interior of the finished duct, to form the first fold 310 of the hemmed ridge 304. The first fold 310 is then bent back upon itself in a parallel manner to form a second fold 312 of the hemmed ridge 304. The hemmed ridge 304 is therefore inwardly formed to be substantially perpendicular to the duct wall 308. The second fold 112 continues until it is broken at a break point 313 which lies approximately in the plane defining the exterior wall of the duct wall 308. A third fold 316 extends a predetermined distance from the break point 313 at an open angle γ, as measured from the plane defining the exterior wall of the duct wall 308.

The third fold 316 is itself bent inwards at a sealing angle λ to form a fourth fold 318, ending in a substantially perpendicularly formed sealing portion 320. The sealing portion 320 will be bent in the direction of arrow I in order to seal the fastseam 300 when the male portion 324 has been inserted into the female groove 306 in the general direction of arrow H.

It is therefore an important aspect of the present invention that, similar to the embodiments disclosed in FIGS. 2-7, the open angle γ and the sealing angle λ are formed so as to permit the insertion of the male portion 324 into the female groove 306 without the use of a hammer or the like. That is, during assembly, the walls of the rectangular duct are slightly deformed, with respect to one another, from a square condition to a parallelogram condition to allow the male portion 324 to be eased into the female groove 306 without the use of any tools.

It is envisioned that the open angle γ is formed preferable between 5 to 45 degrees, and more preferably is formed at approximately 20 degrees from the plane defining the exterior of the duct wall 308. Moreover, the sealing angle λ is envisioned to be formed most preferably between 30 and 60 degrees, and more preferably is formed at approximately 45 degrees. It will be readily appreciated that the open angle γ and sealing angle λ work in conjunction with one another to permit enough clearance in the female portion 302 to allow the male portion 324 to be position in the female groove 306 with a minimum amount of applied force.

It will further be appreciated that the relationship between the open angle γ and sealing angle λ is such that they are generally inversely proportional to one another, wherein when, for example, the open angle γ is increased, the sealing angle λ may also be correspondingly decreased. Regardless of the specific angles utilized by the open angle γ and sealing angle λ, the primary consideration is to ensure enough dimensional clearance to permit the male portion 324 to be inserted into the female groove 306 without the use of hammers or other tools, as previously mentioned.

It is another important aspect of the present invention that once the male portion 324 is located in the female groove 306 and the walls of the rectangular duct are relaxed, with respect to one another, back to their original square condition, that the configuration of the fastseam 300 prevents the disengagement of the male portion 324, even when the sealing portion 320 has not yet been bent over to complete the sealing process.

As discussed previously, the ability of the fastseam 300 to prevent the disengagement of the male portion 324 from the female groove 306, once the fastseam is relaxed into its square condition, provides many inherent advantages. Not only can the fastseam 300 be initially assembled by hand, without the use of hammers or the like, but once assembled, the fastseam 300 maintains its structural integrity until it can be completely sealed by bending the sealing portion 320 in the general direction of arrow H via a single roller sealing apparatus, as discussed previously. Moreover, the present invention provides a less cumbersome and more streamlined assembly process on the whole, especially as the partially assembled duct may be easily handled without coming apart despite not being completely sealed, similar to the embodiment discussed in conjunction with FIGS. 2-7.

It should also be noted that another important consideration does exist, however, regarding the magnitude of the sealing angle λ. As has been discussed previously, the sealing portion 320 must be bent over in order to finish the sealing process of the fastseam 300. Towards this end, it will be readily apparent that the smaller the sealing angle λ is, the easier it will be to bend the sealing portion 320 to its sealed position. Likewise, the larger the sealing angle λ is, the more effort will be required to bend the sealing portion 320 to its sealed position.

As mentioned previously in conjunction with the embodiment illustrated in FIGS. 2-7, the inclined orientation of the sealing portion 320 effectively removes the necessity for any hammering, manual or pneumatic, to complete the sealing process of the fastseam 300 and instead enables the use of a single-roller sealing apparatus to be employed for this purpose.

FIG. 9 illustrates the condition of the fastseam 300 after the male portion 324 has been hand-inserted into the female groove 306 and the sealing portion 320 has been bent over to complete the sealing process.

Figure 10:
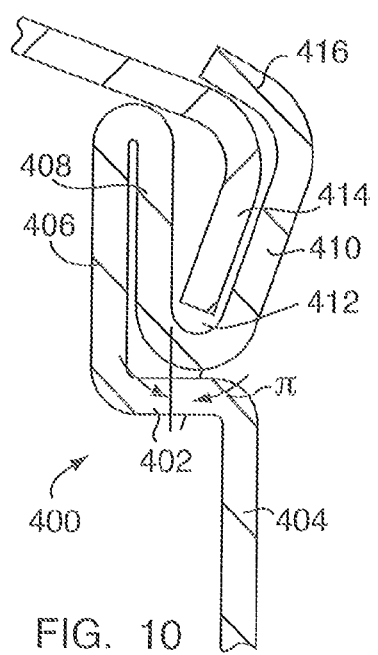
FIG. 10 is a cross-sectional view of the male end of the duct seam after it is inserted into the female end of the duct seam, according to another embodiment of the present invention.

FIG. 10 illustrates the condition of a fastseam 400 according to yet another embodiment of the present invention. As shown in FIG. 10, the fastseam 400 includes a first fold 402 bent to extend inwardly and substantially perpendicular to the duct wall 404, a second fold 406 bent to extend in a direction substantially parallel to said duct wall 404, a third fold 408 bent back upon the second fold 406, and a fourth fold 410 bent at an open angle π from the third fold 408 and defining thereby a female groove 412 for accommodating a male portion 414 therein.

As is also seen in FIG. 10, a sealing portion 416 is bent transverse to the female groove 412 prior to the male portion 414 being inserted into the female groove 412. Moreover, according to a preferred embodiment of the present invention, the open angle π is preferably between 10 to 60 degrees.

As will be appreciated by consideration of the embodiments illustrated in FIGS. 2-10, the present invention provides a fastseam for ducts having a heretofore unknown ease and flexibility of assembly. Moreover, the fastseam of the present invention also advantageously promotes a quicker initial assembly of the ductwork without requiring that the fastseam be completely sealed in order to maintain the substantially square condition of the ductwork. Another inherent benefit of the present invention resides in the ability of the fastseam to closely and substantially resemble the configuration of a completely sealed Pittsburgh seam, an industry standard. The further ability of the present invention to be sealed by a single roller sealing apparatus, rather than requiring labor intensive and loud hammering, is also of substantial benefit as compared to prior art seams.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. A seam for ductwork having a male end portion integrally formed at a distal end of a duct wall, said seam comprising:
a female end portion integrally formed at another distal end of said duct wall; and
wherein said female end portion includes a first fold bent to extend inwardly and substantially perpendicular to said duct wall, a second fold bent to extend in a direction substantially parallel to said duct wall, a third fold bent back upon said second fold such that said third fold and said second fold are substantially parallel, and a fourth fold bent at an open angle from said third fold extending outwardly and defining thereby a female groove for accommodating said male portion therein, said fourth fold having a distal end, said distal end being pre-bent in a direction towards said female groove so as to provide a clearance to permit entry of said male end portion into said female groove.

2. The seam for ductwork according to claim 1, wherein: said open angle is between 10 to 60 degrees.

* * * * *